US012111021B2

(12) United States Patent
Van Der Lubbe et al.

(10) Patent No.: US 12,111,021 B2
(45) Date of Patent: Oct. 8, 2024

(54) LED FILAMENT AND LED FILAMENT LAMP

(71) Applicant: SIGNIFY HOLDING B.V., Eindhoven (NL)

(72) Inventors: Marcellus Jacobus Johannes Van Der Lubbe, Best (NL); Rifat Ata Mustafa Hikmet, Eindhoven (NL); Ties Van Bommel, Horst (NL); Grigory Alexandrovich Onushkin, Eindhoven (NL)

(73) Assignee: SIGNIFY HOLDING, B.V., Eindhoven (NL)

( * ) Notice: Subject to any disclaimer, the term of this patent is extended or adjusted under 35 U.S.C. 154(b) by 157 days.

(21) Appl. No.: 17/775,737

(22) PCT Filed: Nov. 9, 2020

(86) PCT No.: PCT/EP2020/081494
§ 371 (c)(1),
(2) Date: May 10, 2022

(87) PCT Pub. No.: WO2021/094257
PCT Pub. Date: May 20, 2021

(65) Prior Publication Data

US 2022/0390074 A1 Dec. 8, 2022

(30) Foreign Application Priority Data

Nov. 15, 2019 (EP) .................................... 19209552

(51) Int. Cl.
*F21K 9/232* (2016.01)
*H05B 45/20* (2020.01)
(Continued)

(52) U.S. Cl.
CPC ............ *F21K 9/232* (2016.08); *H05B 45/20* (2020.01); *F21Y 2113/13* (2016.08); *F21Y 2115/10* (2016.08)

(58) Field of Classification Search
CPC ................................ H05B 45/20; F21K 9/232
See application file for complete search history.

(56) References Cited

U.S. PATENT DOCUMENTS 9,560,714 B1 * 1/2017 Hjerde .................. H05B 45/28
2010/0066947 A1 * 3/2010 Hathaway ............ G02B 6/0068 349/69

(Continued)

FOREIGN PATENT DOCUMENTS

CN 207921779 U 9/2018
WO 2018157428 A1 9/2018
WO 2019166273 A1 9/2019

*Primary Examiner* — Evan P Dzierzynski
*Assistant Examiner* — Nathaniel J Lee

(57) ABSTRACT

There is provided a light emitting diode, LED, filament lamp (100) which provides LED filament lamp light (100'). The LED filament comprises a first linear array of LEDs (101) and a second linear array of LEDs (106), and a carrier (103). The first linear array of LEDs (101) are arranged on a first surface (102) of the carrier (103) and includes only first LEDs (104) which are configured to emit first white light (105). The second linear array of LEDs (106) are arranged on a second surface (107) of the carrier (103), opposite to said first surface (102), and includes only second LEDs (108) which are configured to emit color controllable light (109). The LED filament light (100') comprises the first white light (105) and/or the color controllable light (109).

15 Claims, 4 Drawing Sheets

(51) Int. Cl.

*F21Y 113/13* (2016.01)
*F21Y 115/10* (2016.01)

(56) References Cited

U.S. PATENT DOCUMENTS

| | | | | |
|---|---|---|---|---|
| 2012/0206050 | A1 | 8/2012 | Spero | |
| 2014/0301062 | A1 | 10/2014 | David et al. | |
| 2017/0130906 | A1 * | 5/2017 | Jiang | H01L 33/62 |
| 2018/0328543 | A1 * | 11/2018 | Bergmann | H05B 45/3577 |
| 2019/0017657 | A1 | 1/2019 | Kim et al. | |

* cited by examiner

LED FILAMENT AND LED FILAMENT LAMP

CROSS-REFERENCE TO PRIOR APPLICATIONS

This application is the U.S. National Phase application under 35 U.S.C. § 371 of International Application No. PCT/EP2020/081494, filed on Nov. 9, 2020, which claims the benefit of European Patent Application No. 19209552.9, filed on Nov. 15, 2019. These applications are hereby incorporated by reference herein.

FIELD OF THE INVENTION

The present invention relates to a LED filament. The present invention further relates to a LED filament lamp comprising said LED filament. The present invention further relates to a luminaire comprising a reflector and said LED filament lamp. The present invention relates to a method for controlling said LED filament.

BACKGROUND OF THE INVENTION

Incandescent lamps are rapidly being replaced by solid state light sources e.g. light emitting diodes (LED) based lighting solutions. It is nevertheless appreciated and desired by users to have retrofit lamps which have the look of an incandescent bulb. For this purpose, one can simply make use of the infrastructure for producing incandescent lamps based on glass and replace the conventional filament with a "LED filament", i.e. a linear array of LEDs arranged on a carrier. One or several such LED filaments may be arranged in a retrofit lamp, i.e. in a light bulb which has the appearance and interface of a conventional incandescent light bulb. Such a retrofit LED bulb will thus include a standard socket (e.g. E27), a light transmissive (e.g. glass) envelope, and one or several LED filaments arranged in the envelope. Such retrofit light bulbs have become increasingly popular for their practical and decorative lighting capacity.

Most commercially available LED retrofit lamps include LED filaments that provide white light with a single color temperature. Such LED filaments typically include one type of LEDs (e.g. blue or UV LEDs) covered by a luminescent coating (e.g. a polymer layer comprising a phosphor). Recently, however, LED filaments have been proposed which are controllable between a warm white (WW) and a cool white (CW) light. Such temperature control may be accomplished with using a first LED filament emitting WW light and a second LED filament emitting CW light and individually controlling the intensity of the individual LED filament. Alternatively, an array of alternating blue and red LEDs (R-B-R-B-R-B) covered by a luminescent coating. By varying the relative intensity of the red and blue LEDs, the resulting white light will have a different color temperature. Alternatively, as shown in WO 2018/157428, two arrays of identical LEDs may be provided with different types of phosphors. Again, the color temperature may be controlled by controlling the relative intensity of the LEDs in the two arrays.

However, current color tunable LED filaments have several drawbacks and/or limitations. They are limited in color and/or color temperature control performance such as a limited color gamut space and/or color temperature range; and/or they provide an unpleasant appearance in the on-state of the lighting device such as a spottiness/dark appearance e.g. when one LED array is dimmed or off (which may have the appearance of a mall functioning filament); and/or they provide an insufficient spatial light distribution e.g. no omnidirectional (white) light; and/or they provide a poor light quality e.g. do not emit flame/extreme warm white light and/or they do not emit white light having a high color rendering index; and/or they do not have the possibility to switch to saturated colored light (e.g. color controllable).

US2019/017657 A1 discloses a filament type light emitting diode (LED) light source which includes a plurality of LED modules, a coupler, and a common connection portion. The LED modules are in a polygonal prism structure and emit white light having different color temperatures or light of different wavelengths. Each LED module having a bar shape at a respective side surface of the polygonal prism structure and includes a first connection electrode and a second connection electrode. The coupler couples the LED modules to maintain the polygonal prism structure. The common connection portion is at one end of the polygonal prism structure and is commonly connected to the second connection electrode of each of the LED modules.

US2018/328543 A1 discloses a lamp which includes an optically transmissive enclosure for emitting an emitted light and a base connected to the enclosure. At least one first LED filament and at least one second LED filament are located in the enclosure and are operable to emit light when energized through an electrical path from the base. The first LED filament emits light having a first correlated color temperature (CCT) and the second LED filament emits light having a second CCT that are combined to generate the emitted light. A controller operates to change the CCT of the emitted light when the lamp is dimmed.

SUMMARY OF THE INVENTION

It is therefore an object of the present invention to provide an improved or alternative LED filament or LED filament which overcomes or at least alleviate at least one of the above-discussed problems of the prior art.

This and other objects are achieved by providing a LED filament having the features in the independent claim. Preferred embodiments are defined in the dependent claims.

Hence, according to the present invention, there is provided a LED filament. The LED filament provides LED filament light. The LED filament comprises a first linear array of LEDs, a second linear array of LEDs, and a carrier. The first linear array of LEDs is arranged on a first surface of the carrier including only first LEDs configured to emit first white light. The second linear array of LEDs is arranged on a second surface of the carrier, opposite to said first surface, including only second LEDs configured to emit color controllable light. The LED filament light comprises the first white light and/or the color controllable light.

The present invention is advantageous in that the LED filament is able to provide (extreme) (warm) white light and/or the colored light e.g. saturated colors, off-black-body-line (BBL) light and/or a high light quality (high color rendering index CRI). The LED filament may provide sequentially (extreme) (warm) white light and the colored light.

The present invention is further advantageous in that the LED filament provides a pleasant appearance in the on-state.

One or more of the above-mentioned effects are achieved because first LEDs (white LEDs) which emit first white light are arranged on the first surface of the carrier and the second LEDs (colored LEDs) which emit color controllable light are arranged on the second surface of the carrier. The spottiness appearance e.g. when one LED array is dimmed or off (which may have the appearance of a mall functioning filament) is not present as both arrays are arranged on a different surface/side (vs. e.g. an -R-G-B-WW- or -R-G-B-WW-CW- architecture on the same side).

A LED filament (lamp), for example, disclosed in WO 2018/157428 is unable to provide white light and/or the colored light. The reason is that no colored LEDs are used. Furthermore, (in case of adding colored LEDs) the light emitted from such a LED filament provides a spottiness appearance. For example, in case the LED filament disclosed in WO 2018/157428 is providing (extreme) warm white light, certain (white) LEDs are not lit and thus provides a spottiness appearance. In case of using a first LED filament providing WW light and a second LED filament providing CW light, in a WW light setting the second LED filament is off (i.e. no light) and having the appearance of a malfunctioning LED filament.

According to an embodiment of the present invention, the first LEDs comprise UV LEDs which emit UV light and/or blue LEDs which emit blue light. The UV LEDs and/or blue LEDs are covered by a first encapsulant which comprises a luminescent material which is configured to at least partly (or fully) convert the UV light and/or the blue light into converted light. The white light comprises (i) the converted light and optionally (ii) the (non-converted) UV light and/or the (non-converted) blue light. Such an architecture is low cost in terms of materials and/or assembly, and provides high quality light (e.g. with respect colored LEDs (RGB LEDs). The reason is that such LEDs are low cost, only a single type (or two types) of LEDs are needed, a light of a phosphor is broader than light of a direct emitting (colored) LED.

According to an embodiment of the present invention, the first encapsulant is provided as a continuous layer over the first LEDs and at least part of the first surface of the carrier. The obtained effect is a more homogenous light emission. The reason is that light is also generated at regions between LEDs.

According to an embodiment of the present invention, the second linear array of LEDs comprises a plurality of M groups, each group comprises a red LED, a green LED and a blue LED. Optionally, LEDs of another color may be added e.g. an amber LED.

According to an embodiment of the present invention, the first LEDs comprise UV LEDs emitting UV light and/or blue LEDs emitting blue light, the UV LEDs and/or blue LEDs being covered by a first encapsulant comprising a luminescent material configured to at least partly convert the UV light and/or the blue light into converted light, wherein the white light comprises (i) the converted light and optionally (ii) the non-converted UV light and/or the non-converted blue light; and the second linear array of LEDs comprises a plurality of M groups, each group comprising a red LED, a green LED and a blue LED. The obtained effect that the LED filament is able to provide (extreme) (warm) white light and/or the colored light e.g. saturated colors, off-black-body-line (BBL) light and/or a high light quality (high color rendering index CRI). The LED filament may provide sequentially (extreme) (warm) white light and the colored light.

According to an embodiment of the present invention, the plurality of M groups is at least 5 and the first linear array of LEDs comprises at least 10 first LEDs. More preferably M is at least 10, and most preferably M is at least 12.

According to an embodiment of the present invention, the second LEDs are covered by a second encapsulant which comprises a light scattering material which is configured to scatter the color controllable light. The second encapsulant may be provided as a continuous layer over the second LEDs and at least part of the second surface of the carrier. The second encapsulant is free from a luminescent material. The obtained effect is an improved spatial and spectral light distribution. The reason is that the color controllable light is mixed by the light scattering material.

According to an embodiment of the present invention, the carrier is translucent. The carrier may be diffuse, but is preferably transparent. The obtained effect is improved spatial and spectral light distribution. The reason is that first white light and the color controllable light is emitted to both directions, namely the white light emitted by the first LEDs is also transmitted through the carrier and the color controllable light is also transmitted through the carrier.

According to an embodiment of the present invention, the first LEDs are arranged at equidistance in the first linear array and have a first pitch. The second LEDs are arranged at equidistance in the second linear array and have a second pitch. The first pitch is different from the second pitch. The obtained is better thermal management. The reason is that less first LEDs and second LEDs are aligned with respect to each other.

According to an embodiment of the present invention, the first LEDs and the second LEDs are interleaved. The obtained is better thermal management. The reason is that no first LEDs are aligned with respect to the second LEDs.

According to an embodiment of the present invention, the first LEDs and the second LEDs are aligned. The obtained effect is improved spatial and spectral light distribution. The reason is that a larger area of a transparent carrier may allow light transmission from the first side of the carrier to the second side of the carrier.

According to an embodiment of the present invention, the length and width of the LEDs is preferably smaller that the distance between neighboring LEDs. For example, the LEDs may have a length (and a width) of 0.4 mm, while the distance between neighboring LEDs is 1 or 2 mm. The obtained effect is improved spatial and spectral light distribution. The reason is that a larger area of a transparent carrier may allow light transmission from the first side of the carrier to the second side of the carrier.

According to an embodiment of the present invention, the pitch between the RGB LEDs in a cluster is smaller than the pitch between neighboring LEDs of two clusters. The obtained effect is improved color mixing.

According to an embodiment of the present invention, the first white light has a color temperature in the range from 1800 to 2500K, more preferably 1900 to 2350 K, most preferably 2000 and 2300 K. Such a color temperature seems preferred by the customer for LED filament lamps. The color rendering index (CRI) is preferably at least 80, more preferably at least 85, most preferably at least 90.

According to an embodiment of the present invention, the first linear array of LEDs and the second linear array of LEDs are both arranged on a same single planar surface. The single planar surface is subsequently folded such that the first linear array of LEDs is arranged on the first surface of a carrier and the second linear array of LEDs is arranged on the second surface of a carrier opposite to said first surface. The folding line may be arranged parallel to the length of the LED filament or perpendicular to the length of the LED filament (between the first LEDs and the second LEDs).

According to an embodiment of the present invention, the first linear array of LEDs and the second linear array of LEDs are arranged on a different carrier. The carriers are subsequently attached e.g. glued together typically with the surfaces which does not comprise any LEDs.

The present invention discloses a LED filament lamp in accordance with claim 11.

According to an embodiment of the present invention, the LED filament lamp further comprises a controller for controlling the LEDs in first linear array of LEDs, and for controlling the LEDs in the second linear array of LEDs.

According to an embodiment of the present invention, the LED filament lamp further comprises at least one LED filament and a controller configured to individually control the power supplied to the red LEDs, the green LEDs and the blue LEDs of the second linear array of LEDs.

According to an embodiment of the present invention, the LED filament lamp comprises at least one LED filament and a controller configured to individually control the power supplied to the first linear array of LEDs, and the blue LEDs, the green LEDs and the red LEDs of the second linear array of LEDs.

According to an embodiment of the present invention, the LED filament lamp comprises at least one LED filament, a light transmissive envelope at least partly surrounding said LED filament, and a connector for electrically and mechanically connecting said LED filament lamp to a socket e.g. of a luminaire. The light transmissive envelope is preferably transparent. The LED filament lamp may comprise a driver and/or a controller. The driver may be arranged to convert an AC current to a DC current. The driver may (also) be arranged to adapt the current level. The controller may be arranged to individually control the first linear array of LEDs and the second linear array of LEDs.

According to an embodiment of the present invention, the LED filament lamp comprises a plurality of N LED filaments. N is preferably in the range from 3 to 8, more preferably 4 to 7, most preferably 5 to 6. The plurality of LED filaments may be arranged at a distance different form zero from the longitudinal axis of the LED filament lamp. The plurality of LED filaments may be each a at a similar distance from the longitudinal axis. Each LED filament (the first LEDs and second LEDs) may be oriented in different directions. For example, in case of 3 LED filaments the directions are at angles $\gamma$ 0, 120 and 240 degrees; in case of 4 LED filaments the directions are at angles $\gamma$ 0, 90, 180 and 270 degrees; in case of 5 LED filaments the directions are at angles $\gamma$ 0, 72, 144, 216 and 288 degrees; in case of 6 LED filaments the directions are at angles $\gamma$ 0, 60, 120, 180, 240 and 300 degrees. The angle $\gamma$ is defined with respect to an axis perpendicular to the longitudinal axis.

According to an embodiment of the present invention, the second surfaces of each LED filament are arranged in a direction facing the inner side of the light transmissive envelope. Alternatively the first surfaces of each LED filament are arranged in a direction facing the inner side of the light transmissive envelope. In this way the spatial-spectral light distribution is improved i.e. is more homogeneous.

According to an embodiment, (i) the second surfaces of each LED filament are arranged in a direction facing the inner side of the light transmissive envelope, or (ii) the first surfaces of each LED filament are arranged in a direction facing the inner side of the light transmissive envelope. With inner side is meant to the central portion (e.g. longitudinal axis) of the light transmissive envelope.

The present invention discloses a luminaire.

The luminaire comprises a reflector and the LED filament lamp according to the invention, wherein the LED filament lamp is at least partly arranged inside the reflector. The obtained effect is a decorative luminaire which provides an improved attractive and appealing light effect. The reason is that the LED filament are visible but part of the LED filament light is redirected by the reflector to a certain direction e.g. a table or floor.

The present invention discloses a method for controlling a LED filament in accordance with claim 12.

According to an embodiment of the present invention, the method for controlling a LED filament comprises powering the first linear array of LEDs, and simultaneously and independently controlling a color (point) and/or color temperature of the color controllable light emitted by the second linear array of LEDs.

According to an embodiment of the present invention, the second linear array of LEDs are controlled to emit color controllable light which is second white light. The second white light may have a color temperature in the range from 1800 to 6500 K. The second white light has a spectral distribution different from the spectral distribution of the first white light. The second white light may be generated by combining the light of the red LEDs, green LEDs and blue LEDs.

According to an embodiment of the present invention, the second linear array of LEDs are controlled to emit second white light having a same color temperature as first white light (emitted by the first linear array of LEDs and/or luminescent material). The obtained effect is a LED filament with advantages described above and having a homogeneous appearance. The reason is that the same color temperature is emitted from both (opposite) sides (surfaces) of the carrier. Preferably the color temperature is in the range from 1800 to 2500 K, more preferably 1900 to 2400 K, most preferably 2000-2300 K. The difference in color temperature is preferably less than 200 K, more preferably less than 150 K, most preferably less than 100 K. Abovementioned scenario may occur for a certain duration e.g. at least 1 minute or at least 10 minutes.

According to an embodiment of the present invention, the LED filament may be arranged in a (3D) spiral or helix configuration. The obtained effect is improved spatial and spectral light distribution. The reason is that the first white light and the color controllable light. Even if the first white light and the color controllable light provide the same color temperature, a (3D) spiral or helix configuration has the advantage of improved spatial and spectral light distribution. The reason is that although the first white light and the color controllable light provide the same color temperature, they differ in spectral distribution.

According to an embodiment of the present invention, the first linear array of LEDs are controlled to emit first white light with a relatively warm color temperature, and the second linear array of LEDs (106) are controlled to emit second white light with a relatively cool color temperature. The obtained effect is improved decorative effect. The reason is that different color temperature is emitted from different sides (surfaces) of the carrier. The first surface emits relatively warm white light (preferably extreme warm white light) (i.e. a color temperature in the range from 1800 to 2400 K) while the second surface emits relative cool light (preferably light for good visibility i.e. light having a color temperature in the range from 2900 to 6500 K). The difference in color is preferably at least 500 K, more preferably at least 600 K, most preferably at least 700 K.

According to an embodiment of the present invention, the color controllable light is not with 15 SDCM from the black body locus. In this embodiment, the color controllable light is typically used for making saturated colors which may be added to the first white light.

Further objectives of, features of, and advantages with, the present invention will become apparent when studying the following detailed disclosure, the drawings and the appended claims. Those skilled in the art will realize that different features of the present invention can be combined to create embodiments other than those described in the following.

BRIEF DESCRIPTION OF THE DRAWINGS

Embodiments of the invention will now be described, by way of example only, with reference to the accompanying schematic drawings in which corresponding reference symbols indicate corresponding parts, and in which.

Figures 1A, 1B, 1C:
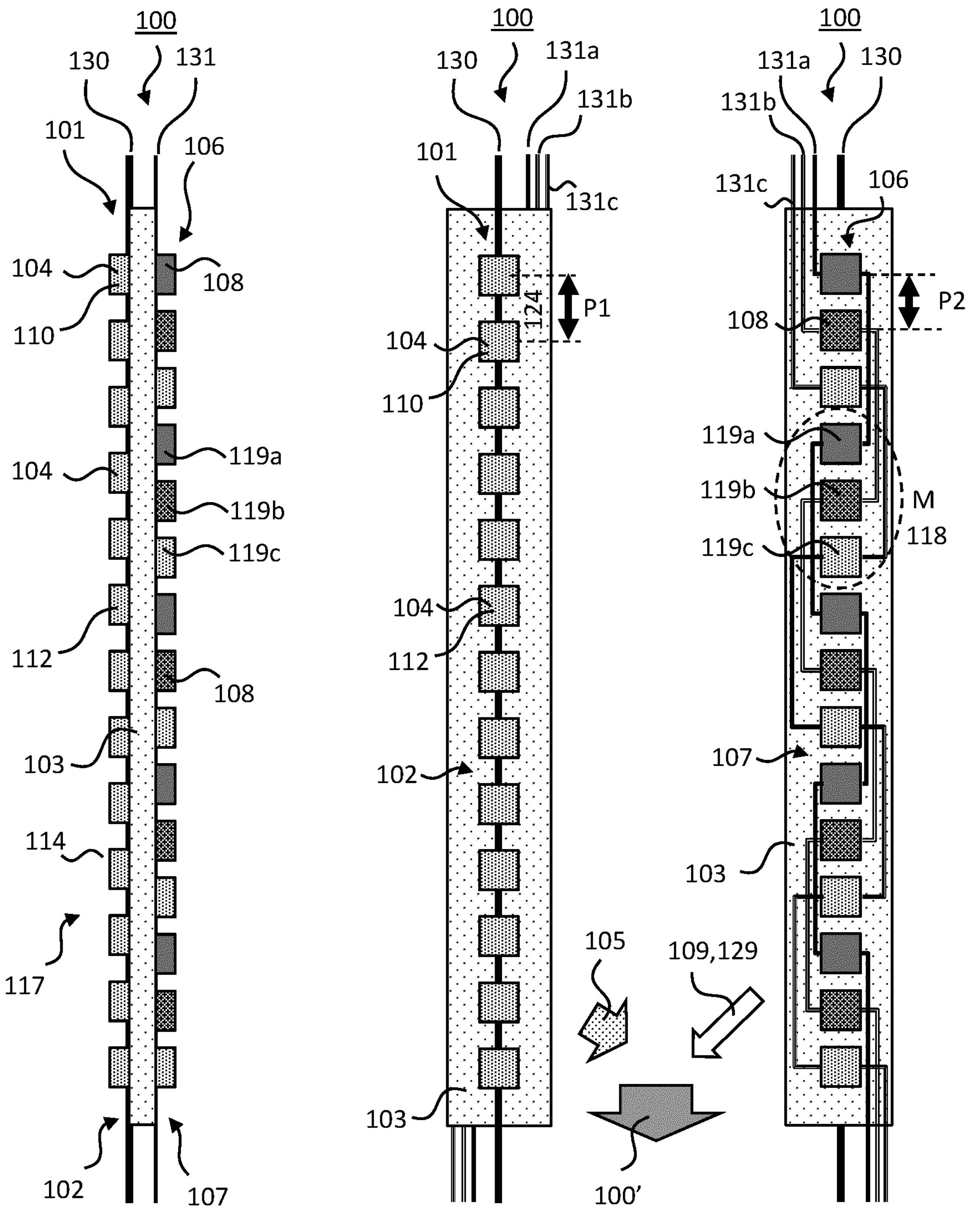
FIG. 1*a-g* show schematic drawings of a LED filament 100 according to embodiments of the present invention.
Figure 1D:
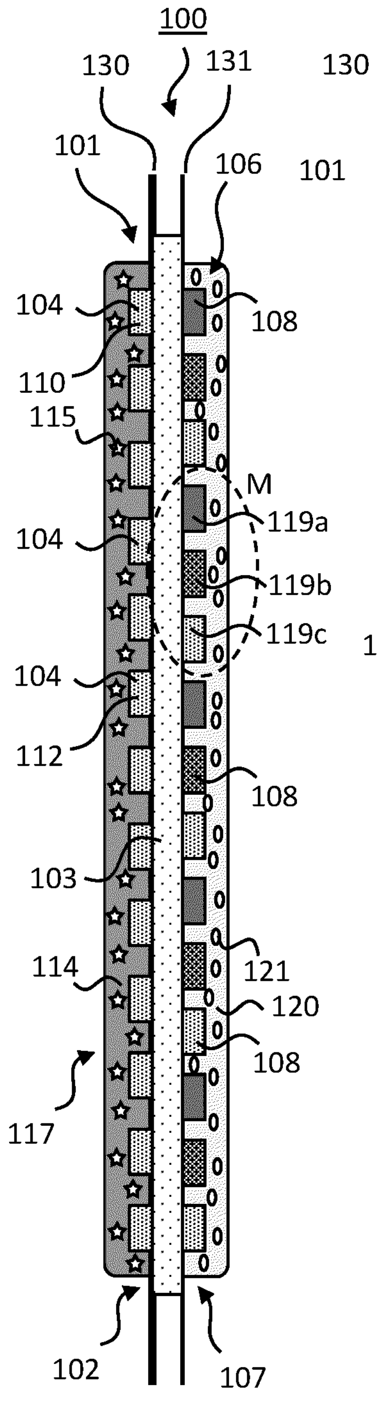
Figure 1E:
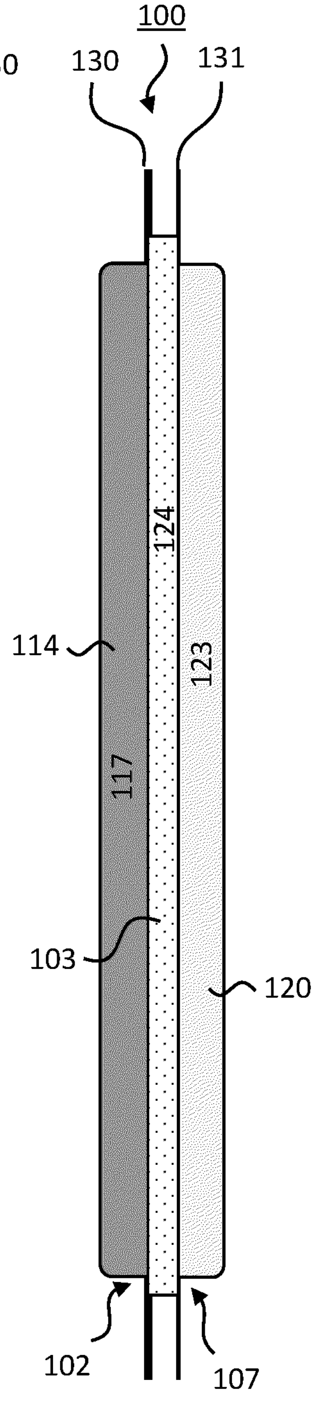
Figure 1F:
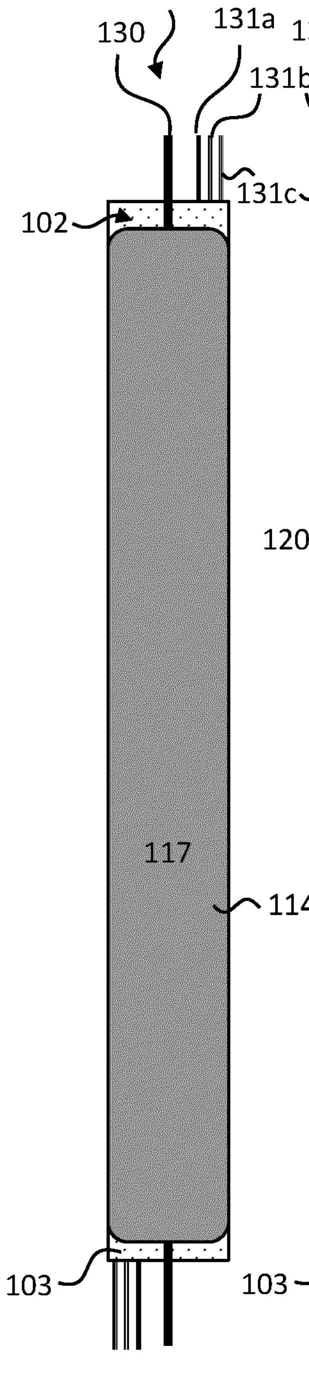
Figure 1G:
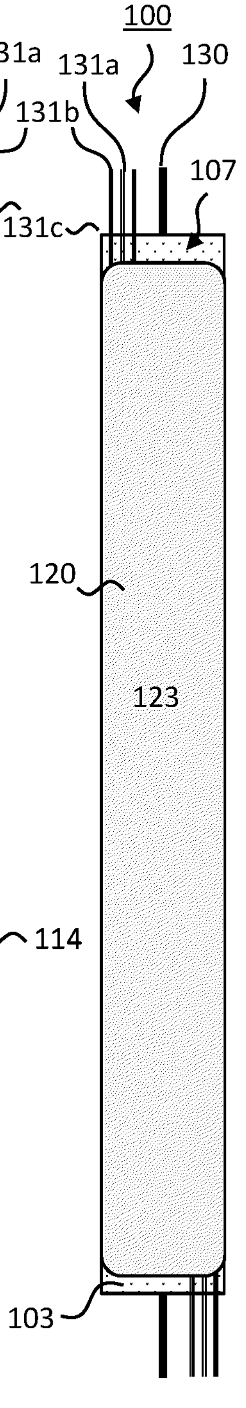

The schematic drawings are not necessarily on scale.

The same features having the same function in different figures are referred to the same references.

DETAILED DESCRIPTION

FIG. 1*a-g* show schematic drawings of a LED filament 100 according to an embodiment of the present invention. As depicted in FIG. 1*a-g*, the LED filament 100 provides LED filament light 100'. The LED filament 100 comprises a first linear array of LEDs 101 and a second linear array of LEDs 106. The first linear array of LEDs 101 are arranged on a first surface 102 of a carrier 103 including only first LEDs 104 which are configured to emit first white light 105. The second linear array of LEDs 106 arranged on a second surface 107 of the carrier 103, opposite to said first surface 102, including only second LEDs 108 configured to emit color controllable light 109. The LED filament light 100' comprises the first white light 105 and/or the color controllable light 109. In this example, the first surface 102 of a carrier 103 does not comprise any LEDs which emit color controllable light 109 and second surface 107 of the carrier 103 does not comprise any LEDs which provides white light 105.

As depicted in FIG. 1*d-g*, the first LEDs 104 comprise UV LEDs 110 which emit UV light 111 and/or blue LEDs 112 emitting blue light 113. The UV LEDs 110 and/or blue LEDs 112 being covered by a first encapsulant 114 comprising a luminescent material 115 configured to at least partly convert the UV light 111 and/or the blue light 113 into converted light 116. The white light 105 comprises (i) the converted light 116 and optionally (ii) the non-converted UV light 111 and/or the non-converted blue light 113.

As depicted in FIG. 1*d-g*, the first encapsulant 114 is provided as a continuous layer 117 over the first LEDs 104 and at least part of the first surface 102 of the carrier 103.

As depicted in FIG. 1*a-g*, the second linear array of LEDs 106 comprises a plurality of M groups 118, each group 118 comprises a red LED 119*a*, a green LED 119*b* and a blue LED 119*c*.

As depicted in FIG. 1*a-g*, M is at least 5 and the first linear array of LEDs 101 comprises at least 10 first LEDs 104.

As depicted in FIG. 1*d-g*, the second LEDs 108 are covered by a second encapsulant 120 comprising a light scattering material 121 configured to scatter 122 the color controllable light 109 (see also FIG. 3, which is introduced here below). The second encapsulant 120 is provided as a continuous layer 123 over the second LEDs 108 and at least part of the second surface 107 of the carrier 103. The second encapsulant 120 is free from a luminescent material 115.

As depicted in FIG. 1*a-g*, the carrier 103 is translucent 124.

As depicted in FIG. 1*a-g*, the first LEDs 104 are arranged at equidistance in the first linear array 101 and have a first pitch P1. The second LEDs 108 are arranged at equidistance in the second linear array 106 and have a second pitch P2. The first pitch P1 is different from the second pitch P2. In this example, P1>P2. The pitch between the RGB LEDs in a cluster may be smaller than the pitch between neighboring LEDs of two different clusters (i.e. between neighboring clusters). The obtained effect is improved color mixing.

As depicted in FIG. 1*a-g*, the first white light 105 may have a color temperature in the range from 1800 to 2500 K.

Figures 2A, 2B, 2C:
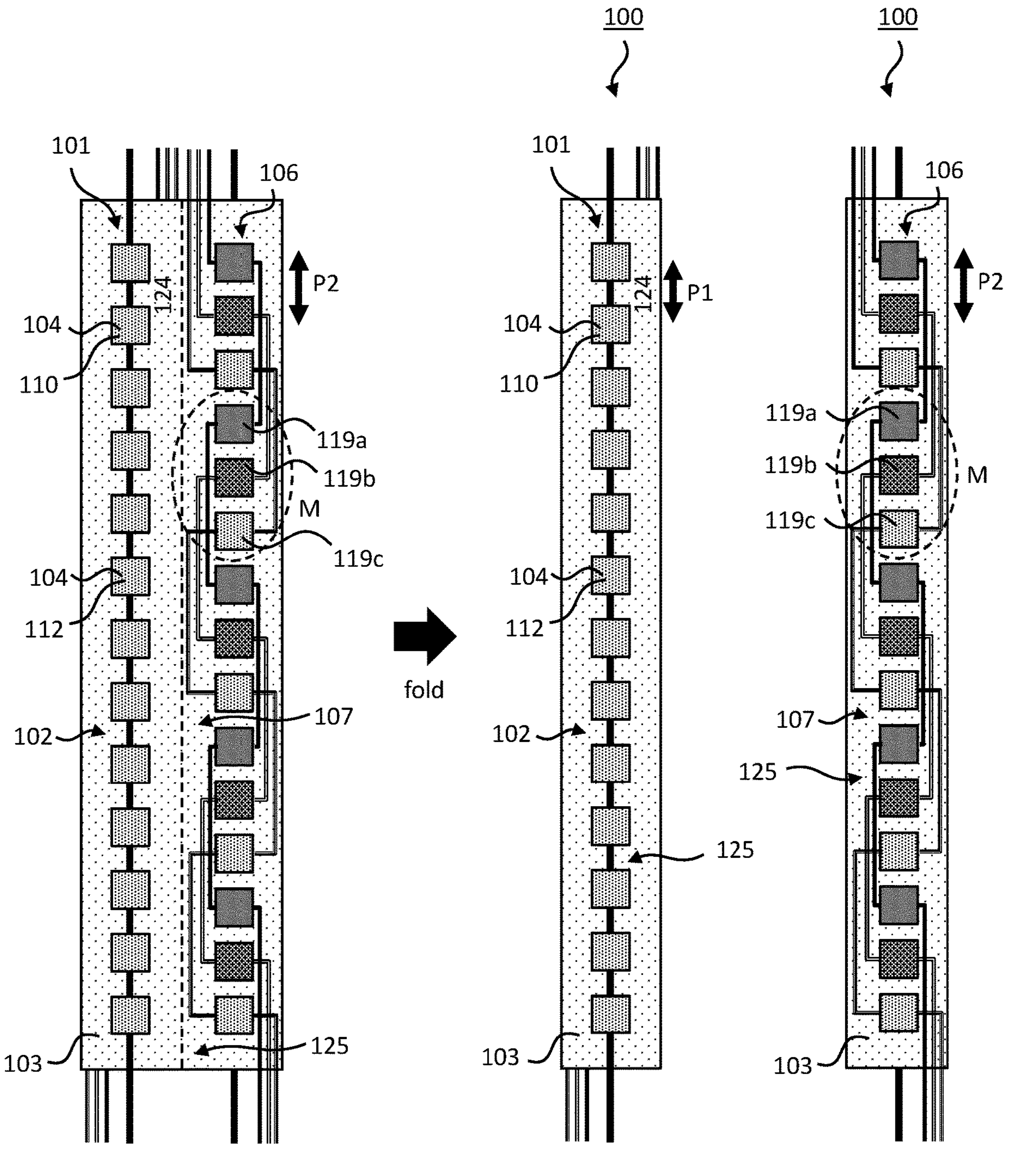
FIG. 2*a-c* show schematic drawings of a LED filament 100 according to an embodiment of the present invention.

FIG. 2*a-c* show schematic drawings of a LED filament 100 according to an embodiment of the present invention. As depicted in FIG. 2, the first linear array of LEDs 101 and the second linear array of LEDs 106 are both arranged on a same single planar surface 125 which is folded (or bended) such that the first linear array of LEDs 101 is arranged on the first surface 102 of a carrier 103, and the second linear array of LEDs 106 is arranged on the second surface 107 of a carrier 103 opposite to said first surface 102.

Figure 3:
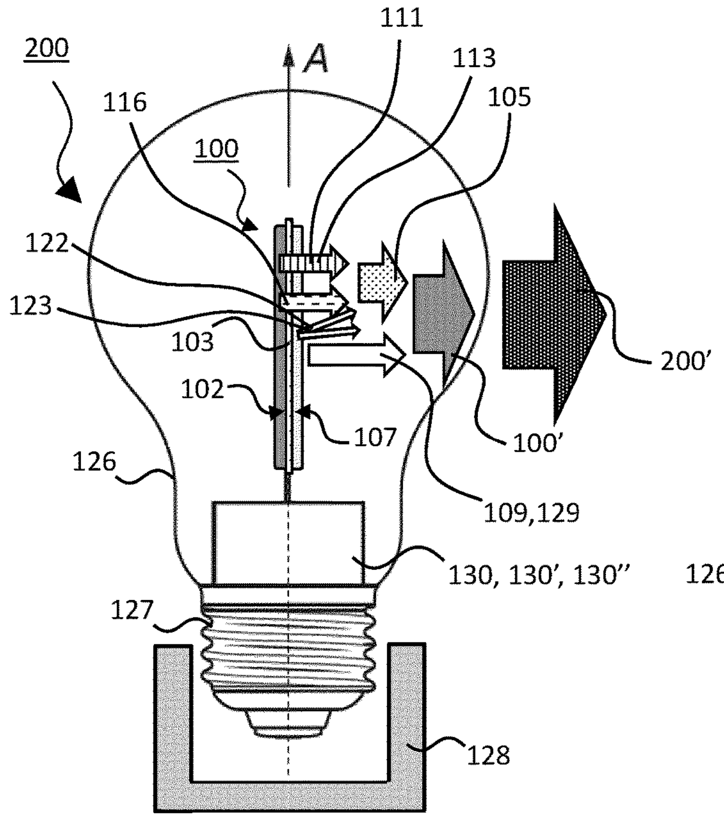
FIG. 3 shows a schematic drawing of a side-view of a LED filament lamp 200 according to an embodiment of the present invention.

FIG. 3 shows a schematic drawing of a side-view of a LED filament lamp 200 according to an embodiment of the present invention. As depicted in FIG. 3, The LED filament lamp 200 comprises a light transmissive envelope 126 and a connector 127. The light transmissive envelope 126 at least partly surrounds said LED filament 100. The connector 127 is arranged for electrically and mechanically connecting said LED filament lamp 200 to a socket 128. The LED filament lamp 200 may also comprise a controller 130 and/or a driver 130' and/or an antenna 130".

Figure 4:
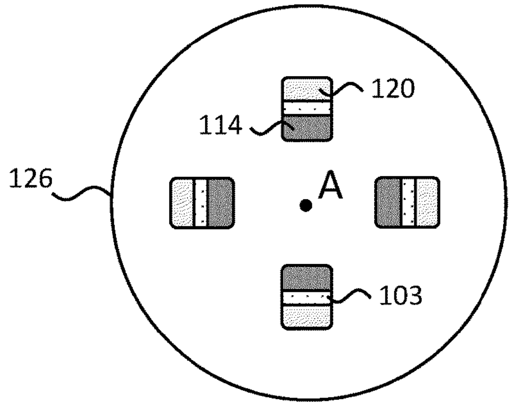
FIG. 4 shows a schematic drawing of a top view of a LED filament lamp 200 according to an embodiment of the present invention.
Figure 5:
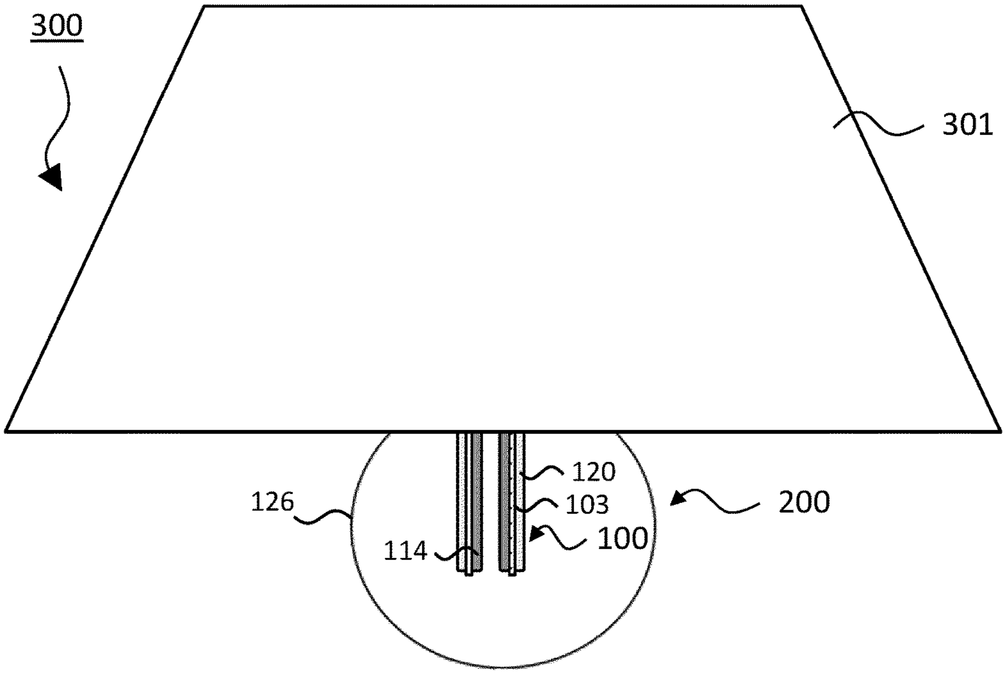
FIG. 5 shows a luminaire comprising a reflector and the LED filament lamp according to an embodiment of the present invention.

FIG. 4 shows a schematic drawing of a top view of a LED filament lamp 200 according to an embodiment of the present invention. As depicted in FIG. 4, the second surfaces 107 of each LED filament 100 are arranged in a direction facing the inner side of the light transmissive envelope 126. Alternatively the first surfaces 102 of each LED filament 100 are arranged in a direction facing the inner side of the light transmissive envelope 126. In this way the spatial-spectral light distribution is improved i.e. is more homogeneous.

As depicted in FIG. 3, a method for controlling a LED filament 100 is shown. The method comprises powering the first linear array of LEDs 101, and simultaneously and independently controlling a color and/or color temperature of the color controllable light 109 emitted by the second linear array of LEDs 106. The second linear array of LEDs 106 may be controlled to emit color controllable light 109 which is second white light 129. In a first example, the second linear array of LEDs 106 are controlled to emit second white light 129 which has a same color temperature as first white light 105. The difference in color is preferably less than 200 K, more preferably less than 150 K, most preferably less than 100 K. In a second example, the first white light 105 has a relatively warm color temperature, and the second linear array of LEDs 106 are controlled to emit second white light 129 with a relatively cool color temperature. The difference in color temperature is preferably at least 500 K, more preferably at least 600 K, most preferably at least 700 K.

A LED filament is typically providing LED filament light and comprises a plurality of light emitting diodes (LEDs) arranged in a linear array. Preferably, the LED filament has a length L and a width W, wherein L>5 W. The LED filament may be arranged in a straight configuration or in a non-straight configuration such as for example a curved configuration, a 2D/3D spiral or a helix. Preferably, the LEDs are arranged on an elongated carrier like for instance a substrate, that may be rigid (made from e.g. a polymer, glass, quartz, metal or sapphire) or flexible (e.g. made of a polymer or metal e.g. a film or foil).

In case the carrier comprises a first major surface and an opposite second major surface, the LEDs are arranged on at least one of these surfaces. The carrier may be reflective or light transmissive, such as translucent and preferably transparent. The LED filament may comprise an encapsulant at least partly covering at least part of the plurality of LEDs. The encapsulant may also at least partly cover at least one of the first major or second major surface. The encapsulant may be a polymer material which may be flexible such as for example a silicone. Further, the LEDs may be arranged for emitting LED light e.g. of different colors or spectrums. The encapsulant may comprise a luminescent material that is configured to at least partly convert LED light into converted light. The luminescent material may be a phosphor such as an inorganic phosphor and/or quantum dots or rods.

The term "substantially" herein, such as in "substantially all light" or in "substantially consists", will be understood by the person skilled in the art. The term "substantially" may also include embodiments with "entirely", "completely", "all", etc. Hence, in embodiments the adjective substantially may also be removed. Where applicable, the term "substantially" may also relate to 90% or higher, such as 95% or higher, especially 99% or higher, even more especially 99.5% or higher, including 100%. The term "comprise" includes also embodiments wherein the term "comprises" means "consists of". The term "and/or" especially relates to one or more of the items mentioned before and after "and/or". For instance, a phrase "item 1 and/or item 2" and similar phrases may relate to one or more of item 1 and item 2. The term "comprising" may in an embodiment refer to "consisting of" but may in another embodiment also refer to "containing at least the defined species and optionally one or more other species".

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

The devices herein are amongst others described during operation. As will be clear to the person skilled in the art, the invention is not limited to methods of operation or devices in operation.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "to comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention further applies to a device comprising one or more of the characterizing features described in the description and/or shown in the attached drawings. The invention further pertains to a method or process comprising one or more of the characterizing features described in the description and/or shown in the attached drawings.

The various aspects discussed in this patent can be combined in order to provide additional advantages. Further, the person skilled in the art will understand that embodiments can be combined, and that also more than two embodiments can be combined. Furthermore, some of the features can form the basis for one or more divisional applications.

The invention claimed is:

1. A light emitting diode filament for providing LED filament light, comprising:

a first linear array of LEDs arranged on a first surface of a carrier including only first LEDs configured to emit first white light, a second linear array of LEDs arranged on a second surface of the carrier, opposite to said first surface, including only second LEDs configured to emit color controllable light, wherein the LED filament light comprises the first white light and the color controllable light, wherein the first LEDs comprise UV LEDs emitting UV light and/or blue LEDs emitting blue light, the UV LEDs and/or blue LEDs being covered by a first encapsulant comprising a luminescent material configured to at least partly convert the UV light and/or the blue light into converted light, wherein the white light comprises (i) the converted light and optionally (ii) the non-converted UV light and/or the non-converted blue light, wherein the first LEDs have a first pitch, wherein the second linear array of LEDs comprises a plurality of M groups, each group comprising a red LED, a green LED and a blue LED, wherein the second LEDs and have a second pitch, and wherein the first pitch is different from the second pitch.

2. The LED filament according to claim 1, wherein the first encapsulant is provided as a continuous layer over the first LEDs and at least part of the first surface of the carrier.

3. The LED filament according to claim 1, wherein M is at least 5 and the first linear array of LEDs comprises at least 10 first LEDs.

4. The LED filament according to claim 1, wherein the second LEDs are covered by a second encapsulant comprising a light scattering material configured to scatter the color controllable light, wherein the second encapsulant is provided as a continuous layer over the second LEDs and at least part of the second surface of the carrier, wherein the second encapsulant is free from a luminescent material.

5. The LED filament according to claim 1, wherein the carrier is translucent.

6. The LED filament according to claim 1, wherein the first LEDs are arranged at equidistance in the first linear array and have a first pitch, wherein the second LEDs are arranged at equidistance in the second linear array and have a second pitch, and wherein the first pitch is different from the second pitch.

7. The LED filament according to claim 1, wherein the first white light having a color temperature in the range from 1800 to 2500K.

8. The LED filament according to claim 1, wherein the first linear array of LEDs and the second linear array of LEDs are both arranged on a same single planar surface which is folded such that the first linear array of LEDs is arranged on the first surface of a carrier, and the second linear array of LEDs is arranged on the second surface of a carrier opposite to said first surface.

9. A LED filament lamp comprising at least one LED filament according to claim 1, a light transmissive envelope at least partly surrounding said LED filament, and a connector for electrically and mechanically connecting said LED filament lamp to a socket.

10. The LED filament lamp according to claim 9, wherein the LED filament lamp comprises a controller configured to individually control the power supplied to the first linear array of LEDs, and the blue LEDs, the green LEDs and the red LEDs of the second linear array of LEDs.

11. The LED filament lamp according to claim 9, wherein (i) the second surfaces of each LED filament are arranged in a direction facing the inner side of the light transmissive envelope, or (ii) the first surfaces of each LED filament are arranged in a direction facing the inner side of the light transmissive envelope.

12. A method for controlling a LED filament according to claim 1, comprising powering the first linear array of LEDs, and simultaneously and independently controlling a color and/or color temperature of the color controllable light emitted by the second linear array of LEDs.

13. The method according to claim 12, wherein the second linear array of LEDs are controlled to emit color controllable light which is second white light.

14. The method according to claim 13, wherein the second linear array of LEDs are controlled to emit second white light having a same color temperature as first white light.

15. The method according to claim 13, wherein the first white light having a relatively warm color temperature, and the second linear array of LEDs are controlled to emit second white light with a relatively cool color temperature.

* * * * *